United States Patent
Creech

[11] Patent Number: 5,865,284
[45] Date of Patent: Feb. 2, 1999

[54] FORMLOCK SHOES WITH FLATS

[75] Inventor: Michael Z. Creech, Grosse Pointe Woods, Mich.

[73] Assignee: Dana Corporation, Toledo, Ohio

[21] Appl. No.: 666,068

[22] Filed: Jun. 21, 1996

[51] Int. Cl.$^6$ .................................................. B60K 41/20
[52] U.S. Cl. .......................................... 192/8 R; 188/134
[58] Field of Search .................. 192/7, 8 R; 188/74, 188/134

[56] References Cited

U.S. PATENT DOCUMENTS

| | | | |
|---|---|---|---|
| 1,617,745 | 2/1927 | Cousinard . | |
| 3,335,831 | 8/1967 | Kalns | 192/8 R |
| 3,414,095 | 12/1968 | Kalns | 192/8 R |
| 3,497,044 | 2/1970 | Kalns | 192/8 R |
| 4,245,728 | 1/1981 | Murteza . | |
| 4,533,400 | 8/1985 | Benedict . | |
| 4,591,029 | 5/1986 | Da Foe | 192/8 R X |
| 4,601,370 | 7/1986 | Papadopoulos | 192/8 R |
| 5,007,511 | 4/1991 | Ostrander . | |
| 5,065,854 | 11/1991 | Serrano et al. | 192/7 X |
| 5,104,461 | 4/1992 | Ostrander . | |
| 5,123,972 | 6/1992 | Ostrander . | |

FOREIGN PATENT DOCUMENTS

| | | |
|---|---|---|
| 1216313 | 12/1970 | United Kingdom . |
| 1223813 | 3/1971 | United Kingdom . |

*Primary Examiner*—Khoi Q. Ta
*Assistant Examiner*—Saúl Rodríguez
*Attorney, Agent, or Firm*—Rader, Fishman & Grauer PLLC

[57] ABSTRACT

A bi-directional back stopping clutch having improved output pins connecting between brake shoes and an output member. During driving, the output pins transfer torque to the output member. When a sufficient back driving force is applied to the output member, the output pin is skewed to move the brake shoes into forceful contact with a brake drum surface. The contact surfaces between the pins and the brake shoes are flat meeting surfaces, and the pins may be spaced apart by including at least one spring or a combination of springs and spacers. The inner surface of the input yoke and the output member openings are laser hardened. The output member and the input member may be provided with a dual keyed hub at both ends, with the hub formed by machining a bore through the part and cutting the keys by broaching.

19 Claims, 3 Drawing Sheets

FORMLOCK SHOES WITH FLATS

FIELD OF THE INVENTION

The invention relates to bi-directional back stopping clutches and more particularly to an improved output pin and brake shoe configuration within a bi-directional back stopping clutch assembly.

BACKGROUND OF THE INVENTION

Bi-directional torque generator devices are well known which are adapted to selectively rotate an output shaft in either a clockwise or counterclockwise direction. Usually, the output shaft of the device is connected to an input shaft of a driven device for rotation therewith, and rotation of the output shaft transmits torque to the driven device. In certain situations, however, the driven device may tend to back drive torque to the device. To prevent this back driving action, a back stopping clutch is usually coupled between the output shaft of the device and the input shaft of the driven device. A typical bi-directional back stopping clutch includes an input yoke connected to a pair of opposed brake shoes disposed within a hollow cylindrical brake drum. The brake shoes are generally semi-circular in shape, having arcuate braking surfaces which correspond to the inner surface of the brake drum. A pair of drive pins are disposed between the brake shoes, normally in parallel alignment. The drive pins extend into apertures formed in an output member, which is connected to the input shaft of a driven device.

Under normal operating conditions, the input yoke rotates the brake shoes, the drive pins, and the output member within the brake drum, thereby transmitting torque through to the driven device from the torque generating device. However, if the driven device attempts to back drive torque through the clutch, rotation of the output member causes the drive pins to become skewed. As a result, the brake shoes are spread apart from one another into locking frictional engagement with the inner surface of the brake drum. In this manner, the clutch prevents back driving of the torque generating device by the driven device.

The generally semi-circular brake shoes, which may include hardened wear-resistant inserts at the braking surfaces, are mounted in an opposing relationship. It is known in the prior art to form circular openings between the brake shoes at locations equally spaced on opposite sides of the axis of rotation for the input yoke. A pair of output pins extend between these openings and aligned openings on an output member. The output member is connected to an output shaft. These prior art shoe designs that utilize circular openings between the brake shoes require very tight tolerances, typically on the border of manufacturability, within the circular openings. As a result, a slight mismatch of pin radius and the circular openings formed between the brake shoes will prevent assembly or at least significantly compromise the clutch's performance. Additionally, the complicated geometry requires the use of castings which are then subjected to rough machining operations, increasing manufacturing time and expense.

Also in the prior art, the input yoke and the output member include "blind" holes requiring shaper cutting of key slots for both the input and output shafts. Again, tight tolerances are required for both the shaper cutting and the blind holes, and the shaper cutting keying process is very time consuming, difficult and expensive.

Prior art output pins have a generally cylindrically body with a quasi-spherical head at the end which fits into an output member opening. The spherical head allows the pin to tilt or skew in the output member opening sufficiently to engage the brake without interference between the skewed pins and the output member. The portion of the output pin between the brake shoes is formed with a uniform cylindrical body terminating at a flat end. Alternatively, it is known to construct an output pin having a generally spherical head and having two annular ridges, one adjacent the flat end of the pin and the other spaced between the two ends of the pin. In both cases, the generally cylindrical body of the pin engages the brake shoes within the generally circular openings formed between the brake shoes at locations equally spaced on opposite sides of the axis of rotation for the input yoke. A spring pocket is also formed in each brake shoe along the common border in a location between the circular openings formed between the brake shoes. The spring pocket requires machining a blind hole into each opposing brake shoe surface, and also requires tight manufacturing tolerances.

Thus, the manufacturing tolerances required for each respective component results in an overall total assembly stack-up tolerance. The total tolerance varies from one assembly to another. Further, the total tolerance can vary within each clutch assembly due to internal clearances of the parts. These differences can lead to a substantial variation in clutch performance between different assemblies.

SUMMARY OF THE INVENTION

The invention relates to an improved bi-directional back stopping clutch output pin and brake shoe design. An output pin includes two opposed flat surfaces, each of which is adapted to engage a mating flat surface of a brake shoe. Thus each brake shoe includes a flat surface aligned in an opposing parallel relationships such that a gap is formed between the brake shoes. The output pins are aligned in an equally spaced relation between the brake shoes, one on either side of the axis of rotation for the input yoke. The pins are positionally maintained along the mated flat surfaces by filling the area between the pins with a combination of one or more springs or spacers.

Further, the improved bi-directional back stopping clutch assembly of the present invention is designed to permit the machining of holes through the input and output members, and the broaching of key slots for those shafts. Therefore, the clutch assembly may be manufactured at significantly reduced cost over the prior art due to simplified geometry and reduced manufacturing time.

More specifically, in a first embodiment, the output pin of a bi-directional back stopping clutch is constructed with a generally spherical head at one end. The other end is generally cylindrical, but has two flat surfaces on opposite sides to engage mating brake shoes within a gap formed between opposing, parallel flat surfaces of the brake shoes. The brake shoes are generally semi-circular, with arcuate braking surfaces which selectively engage the brake drum. The brake shoes are mounted with the flat surfaces in an opposing relationship to create a gap therebetween. It is these two opposing parallel flat surfaces which are engaged by the flat parallel surfaces of the output pins. Within the clutch assembly, the pins are maintained in a spaced relationship between the brake shoes through the addition of a spring between two small spacers, all of which are positioned between the two pins.

In a second embodiment, the pins are maintained in spaced relationship by the insertion of two springs therebetween. In both the first and second embodiments, the input yoke and the output member have holes for receiving shafts machined through them, and have key slots broached into diametrically opposite locations of the hole. A single or dual keyed shaft may then be inserted at either location.

BRIEF DESCRIPTION OF THE DRAWINGS

The features and inventive aspects of the present invention will become more apparent upon reading the following detailed descriptions, claims and drawings, of which the following is a brief description:

DETAILED DESCRIPTION OF A PREFERRED EMBODIMENT

Figure 1:
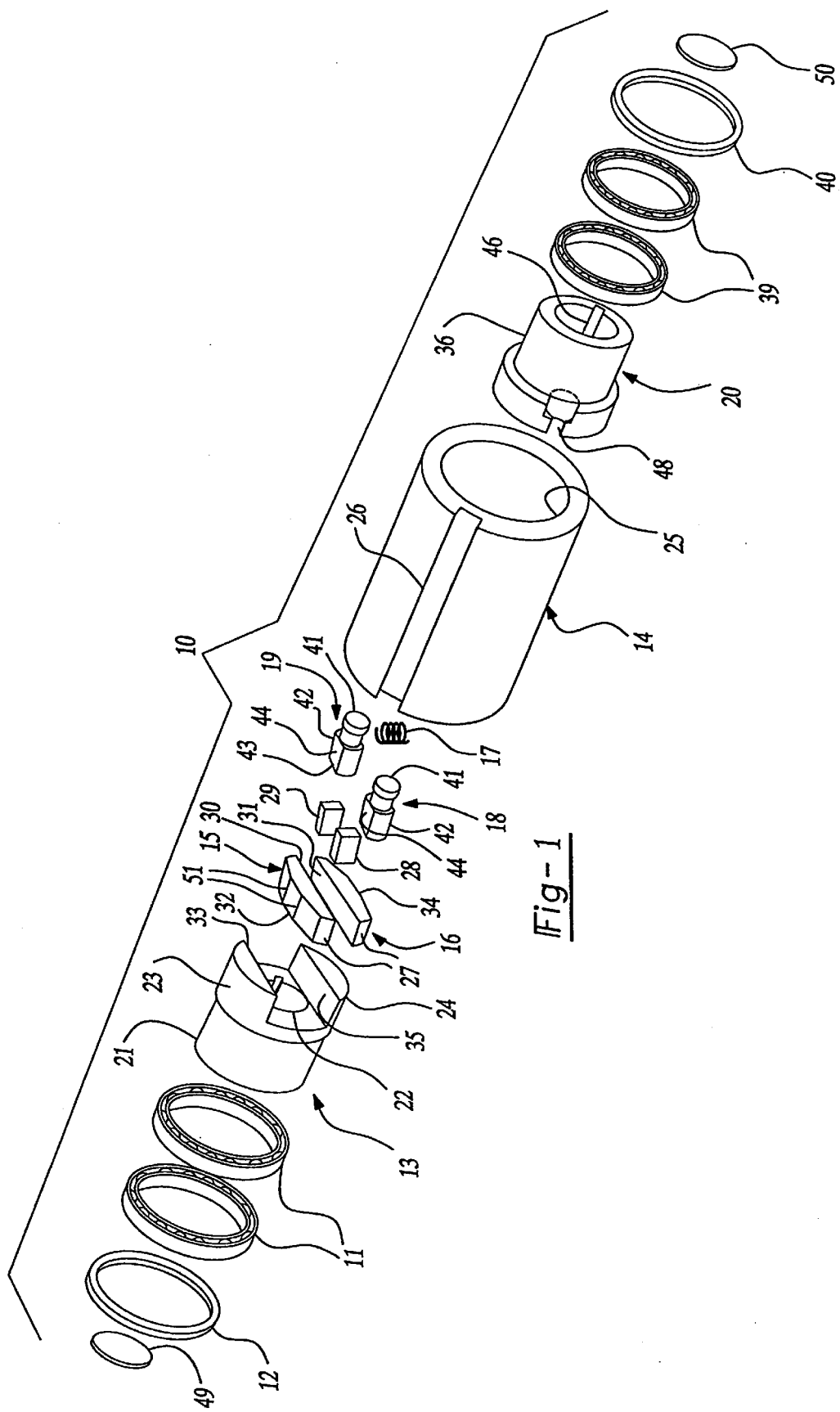
FIG. 1 is an exploded perspective view of an improved bi-directional back stopping clutch according to a first embodiment of the invention.

An exploded perspective view is shown of an improved bi-directional back stopping clutch 10 is illustrated in FIG. 1. Clutch 10 is connected between an input yoke 13 and an output member 20. Input yoke 13 includes a keyed opening 22 to receive an output shaft (not shown) from a torque generating device. During normal operation, clutch 10 connects a driving torque from the input yoke 13 to the output member 20. In the event that an excessive back drive torque is applied to output member 20 by way of a load from a driven device (not shown), the clutch 10 establishes a braking force through yoke 13 and output member 20.

Figure 2:
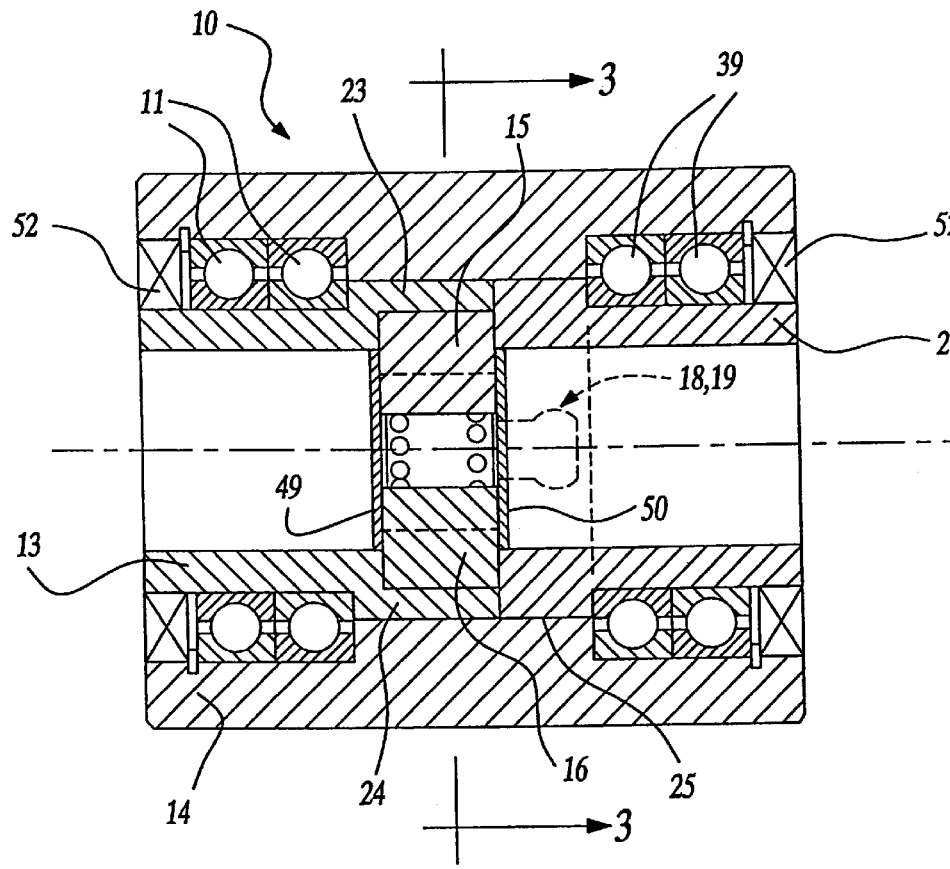
FIG. 2 is a cross-sectional assembly view of an improved bi-directional back-stopping clutch according to the invention.

Besides yoke 13 and output member 20, clutch 10 generally includes a set of bearings 11, a retainer ring 12, an outer race 14, a pair of brake shoes 15 and 16, a compression spring 17, a pair of output pins 18 and 19, a second set of bearings 39, and a second retainer ring 40. As shown in FIG. 2, clutch 10 may also include two seals 52. The torque generating device output shaft is connected through a key (not shown) to a complimentary keyed opening 22 at the axis or rotation for the input yoke 13. Input yoke 13 has a cylindrical outer surface 21 and two-spaced projections 23 and 24 which may be in the form of cylindrical segments, as illustrated, or may be of other known designs. Bearings 11 are mounted on the outer surface 21 of yoke 13, and are positionally maintained by retainer ring 12. Similarly, bearings 39 are mounted on an outer surface 36 of output member 20, and are positionally maintained by a retainer ring 40.

Outer race 14 is a hollow cylinder having an inner brake drum surface 25. The outer diameter of input yoke 13, bearings 11, ring 12 and brake drum surface 25 are sized so that at least projections 23 and 24 of yoke 13 can extend into and rotate within brake drum 25 on bearings 11. Likewise, the outer diameter of output member 20, bearings 39 and ring 40 are sized so that output member 20 can extend into and rotate within brake drum 25 on bearings 39. A key slot 26 or other suitable means is provided on outer race 14 for securing it against rotation.

Brake shoes 15 and 16 are generally semi-circular and have generally arcuate surfaces 27 which are normally spaced from but adjacent to the walls of brake drum surface 25 when clutch 10 is assembled. Brake shoes 15 and 16 have flat surfaces 30 and 31, respectively, which face one another and are slightly spaced apart when clutch 10 is assembled. Shoe 15 includes a second smaller flat surface 32 parallel to surface 30 for normally abutting a mating surface 33 on the input yoke projection 23 while shoe 16 has a second flat surface 34 parallel to surface 31 for normally abutting a surface 35 on input yoke projection 24. Surfaces 33 and 35 on the interior of yoke 13 are made of hardened steel, preferably laser hardened ASTM A331, which is first machined to the required dimensions and then laser hardened. Laser hardening is preferred because distortion of the part is reduced.

Spring 17 is located between flat surfaces 30 and 31 on brake shoes 15 and 16 to urge them away from each other and against the brake drum surface 25. When brake surfaces 30 and 31 are placed together with spring 17 therebetween, spacers 28 and 29 are located an equal distance from opposite sides of the axis of rotation for brake shoes 15 and 16, and also on opposite sides of spring 17. The two pins 18 and 19 are also located an equal distance from opposite sides of the axis of rotation for brake shoes 15 and 16 adjacent to the two spacers 28, 29. Spacers 28 and 29 ensure that pins 18 and 19 are located on surfaces 30 and 31 further from the axis of rotation of brake shoes 15 and 16 than perpendicular projections of sides 51 of surfaces 32 and 34 onto surfaces 30 and 31. As a consequence, if a sufficient force is exerted on either of the pins 18 and 19 in a direction perpendicular to surface 30, they cock, resulting in the application of additional load by brake shoe 15 onto brake drum surface 25. Similarly, if a sufficient force is exerted on either pin 18 or pin 19 in a direction perpendicular to surface 31, they cock, resulting in the application of additional load by brake shoe 16 onto brake drum surface 25.

Brake shoes 15 and 16, and all components therebetween, are maintained in their position axially during operation of the clutch by plugs 49 and 50. Plugs 49 and 50 are sized to bit within openings 22 and 46, respectively, for easy assembly.

Pins 18 and 19 are identical. Each has a quasi-spherical head 41 on one end, a second end 43, and a shank 42 therebetween. Each generally cylindrical shank 42 includes two opposite and parallel flat sides 44 which are parallel to and are received by flat brake shoe surfaces 30 and 31 when the clutch 10 is assembled.

Output member 20 has a keyed central or axial opening 46 for engaging the output shaft. Spaced an equal distance on opposite sides of the axial opening 46 are two openings 48. Once assembled, openings 48 are normally aligned with and receive the heads 41 on output pins 18 and 19. At least the interior of openings 48 are also laser hardened after machining.

As shown in FIGS. 1 and 2, during normal operation of clutch 10, there is insufficient back drive force on the output member 20 to engage the brake formed by brake shoes 15 and 16 and inner brake drum surface 25 of outer race 14. Plugs 49, 50 maintain the axial position of brake shoes 15 and 16 during clutch operation while spring 17 urges brake shoes 15 and 16 apart into contact with input member projections 23 and 24. Torque applied through input yoke 13 is transferred through projections 23 and 24 to rotate brake shoes 15 and 16. As brake shoes 15 and 16 rotate, the torque is transferred through the output pins 18 and 19 to output member 20. Output pins 18 and 19 will normally remain parallel to the axis of rotation of the clutch 10. If a sufficient back driving torque is applied to output member 20 relative to the input yoke 13, the output member 20 will tend to rotate relative to brake shoes 15 and 16. The relative rotation causes pins 18 and 19 to become skewed and to function as lever arm forcing the brake shoes to move into frictional contact with the brake drum surface 25 to impart a braking action. The braking action will be a function of the amount of back drive torque. The braking action will occur regardless of the direction in which the input yoke 13 is rotated and regardless of the direction of the back drive torque on the output member 20.

Figure 3:
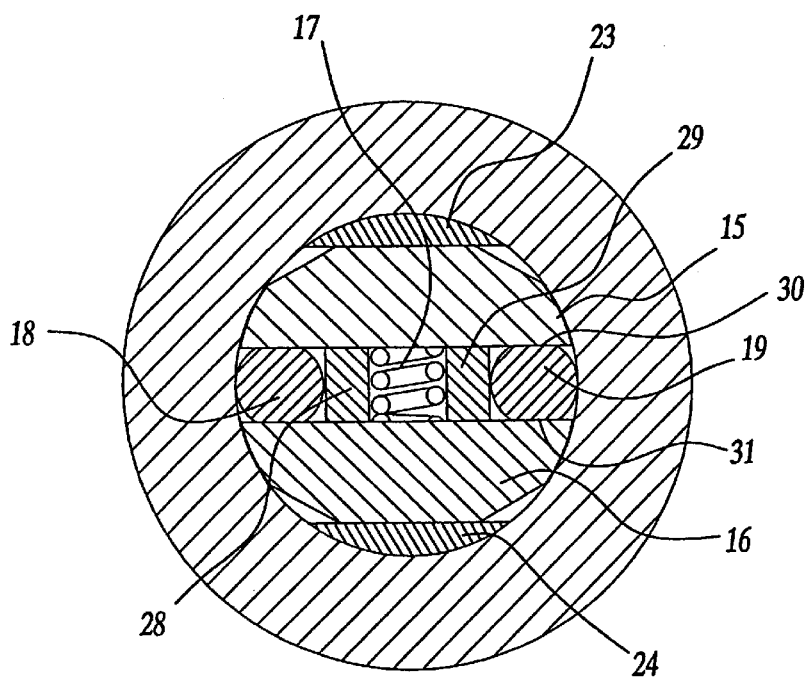
FIG. 3 is a fragmentary cross-sectional view of the first embodiment of the invention taken along arrows 3—3 of FIG. 2.

In a first embodiment of the invention, shown in FIG. 3, brake shoes 15 and 16 are assembled within brake drum 25 between input yoke projections 23 and 24. Flat surfaces 30 and 31 of brake shoes 15 and 16, respectively, are aligned in opposing, parallel positions to receive output pins 18 and 19 therebetween. Spring 17 is also received between flat surfaces 30. The positions of pins 18, 19 are maintained relative to spring 17 through the use of spacer inserts 28 and 29.

Because the brake shoes include flat surfaces, no circular openings need be machined into the brake shoes. As a consequence, manufacture of the inventive device takes substantially less time, and costs substantially less, than prior art clutch assemblies. Additionally, manufacture of the pin need not incur such tight tolerances as required in the prior art. Any excess space between the brake shoes is taken up by spacer inserts 28 and 29, which may vary in size between clutches. Since spacer inserts are easily machined, a further reduction in manufacture difficulty and expense is achieved.

Figure 4:
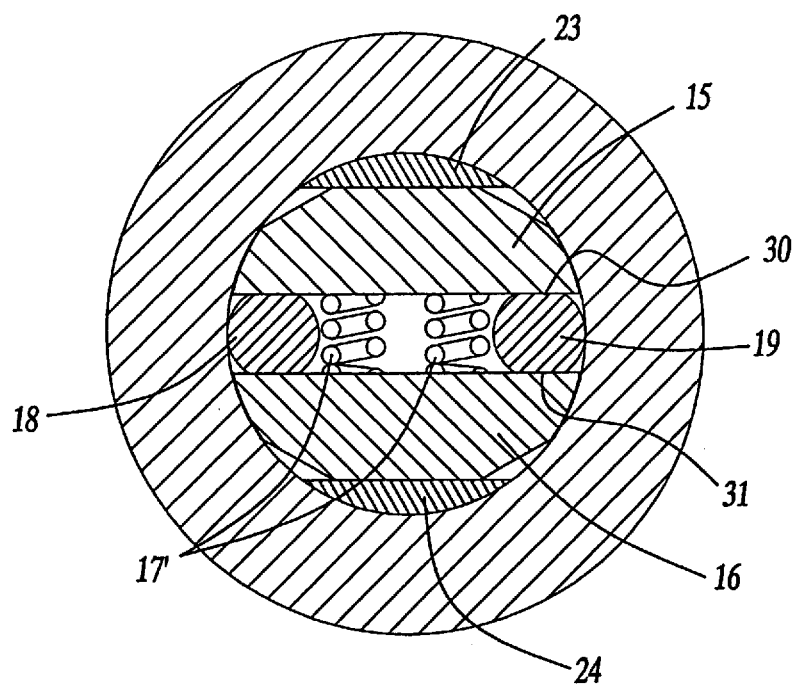
FIG. 4 is a fragmentary cross-sectional view of a second embodiment of the invention taken along arrows 3—3 of FIG. 2.

A second embodiment is shown in FIG. 4. In FIG. 4, all components are identically referenced as in FIG. 3. However, the position of pins 18, 19 may also be maintained by two springs 17'. Springs 17' may be of opposite lead direction to prevent meshing of the springs which results in loss of spacing control. In the second embodiment, fewer parts are utilized, and the combination of two springs optionally provides greater force for urging brake shoes 15 and 16 apart into contact with the brake drum surface 25. The two springs 17' may need to have opposite lead directions to prevent meshing.

Preferred embodiments of the present invention have been disclosed. A person of ordinary skill in the art would realize, however, that certain modifications would come within the teachings of this invention. This invention may be adapted to other known clutch designs such as those illustrated in U.S. Pat. Nos. 5,007,511, 5,104,461 and 5,123,972, and assigned to Dana Corporation. Therefore, the following claims should be studied to determine the true scope and content of the invention.

What is claimed is:

1. A bi-directional back stopping clutch comprising:

a hollow outer race having a cylindrical inner surface;

a pair of brake shoes disposed within said outer race, said brake shoes each including a planar surface, said brake shoes disposed within said outer race such that said planar surfaces of said brake shoes are disposed in an opposed generally parallel alignment to form a gap therebetween;

an input member engaged with said brake shoes for rotating said brake shoes within said outer race;

an output member having at least one opening formed therein;

an output pin having a head portion and a shank portion, said head portion disposed within said output member opening, said shank portion including two parallel flat sides, said shank portion disposed within said gap between said opposing flat surfaces of said brake shoes, said sides adapted to frictionally engage said corresponding flat surface of said brake shoes, said pin skewing in response to a predetermined back driving torque on said output member to move said brake shoes into contact with said inner surface to prevent rotation; and a spacing component disposed within said gap formed by said opposing parallel surfaces of said brake shoes.

2. A bi-directional back stopping clutch as recited in claim 1, wherein said spacing component includes a spring and at least one spacer block, said spring having a diameter equal to the width of said brake shoe.

3. A bi-directional back stopping clutch as recited in claim 1, wherein said spacing component includes two springs, said springs having a diameter equal to the width of said brake shoes.

4. A bi-directional back-stopping clutch as recited in claim 3, wherein said springs are arranged with opposite lead directions to prevent meshing.

5. A bi-directional back stopping clutch as recited in claim 1, wherein said input member and said output member are laser hardened.

6. A bi-directional back stopping clutch as recited in claim 1, wherein said input member and said output member are provided with openings, said openings machined through the input member and output member, respectively.

7. A bi-directional back stopping clutch as recited in claim 6, wherein said openings include dual key slots for receiving a dual keyed shaft, said slots cut by broaching.

8. In a bi-directional back stopping clutch including a brake drum, an input member, a pair of adjacent brake shoes located within said brake drum and attached to said input member, a pair of output pins having first ends and second ends, an output member having a pair of spaced openings receiving said second ends, and means for applying a driving torque through said shoes and said pins to said output member, said pins skewing in response to a predetermined back driving torque on said output member to move said brake shoes in contact with said brake drum, the improvement comprising:

said first ends of said output pins including two flat sides on opposite sides of said first ends of said output pins, said sides being generally parallel; and each of said adjacent shoes including a planar surface, said shoes aligned such that said planar surfaces are disposed in an opposing generally parallel manner to form a gap therebetween, said sides engaging the corresponding flat surface of said shoes, said gap including at least one spacer component.

9. An improved bi-directional back stopping clutch as recited in claim 8, wherein said spacing component includes at least one spacer block and a spring, said spring having a diameter equal to the width of said shoe.

10. An improved bi-directional back stopping clutch, as set forth in claim 9, wherein said spacer component includes two springs, said springs having a diameter equal to the width of said shoe.

11. An improved bi-directional back stopping clutch, as set forth in claim 8, wherein said springs are arranged with opposite lead directions to prevent meshing.

12. An improved bi-directional back stopping clutch, as set forth in claim 8, wherein said input member and said output member are provided with openings, said openings machined through the input member and output member, respectively.

13. An improved bi-directional back stopping clutch, as set forth in claim 12, wherein said openings include dual key slots for receiving a dual keyed shaft, said slots cut by broaching.

14. A bi-directional back stopping clutch comprising:

a hollow outer race having a cylindrical inner surface;

a pair of brake shoes disposed within said outer race, said brake shoes each including a first planar surface and a second planar surface, said first planar surface smaller than and generally parallel to said second planar surface, said brake shoes disposed within said outer race such that said second planar surfaces of said brake shoes are disposed in opposed generally parallel alignment to form a gap therebetween;

an input member engaged with said brake shoes along said first planar surfaces for rotating said brake shoes within said outer race;

an output member having at least one opening formed therein;

an output pin having a head portion and a shank portion, said head portion disposed within said output member opening, said shank portion including two parallel flat sides disposed within said gap and adapted to frictionally engage said opposing second planar surfaces of said brake shoes; and a spacing component disposed within said gap formed by said opposing parallel surfaces of said brake shoes.

15. A bi-directional back stopping clutch as recited in claim 14, wherein said spacing component includes a spring and at least one spacer block, said spring having a diameter equal to the width of said brake shoe.

16. A bi-directional back stopping clutch as recited in claim 14, wherein said spacing component includes two springs, said springs having a diameter equal to the width of said brake shoes.

17. A bi-directional back-stopping clutch as recited in claim 16, wherein said springs are arranged with opposite lead directions to prevent meshing.

18. A bi-directional back-stopping clutch as recited in claim 14, wherein said input member and said output member are provided with openings, said openings machined through the input member and output member, respectively.

19. A bi-directional back-stopping clutch as recited in claim 18, wherein said openings include dual key slots for receiving a dual keyed shaft, said slots cut by broaching.

* * * * *